US005554739A

United States Patent [19]

Belmont

[11] Patent Number: 5,554,739
[45] Date of Patent: Sep. 10, 1996

[54] PROCESS FOR PREPARING CARBON MATERIALS WITH DIAZONIUM SALTS AND RESULTANT CARBON PRODUCTS

[75] Inventor: James A. Belmont, Acton, Mass.

[73] Assignee: Cabot Corporation, Boston, Mass.

[21] Appl. No.: 356,653

[22] Filed: Dec. 15, 1994

[51] Int. Cl.$^6$ ................... C07C 245/02; C07C 245/04
[52] U.S. Cl. .................. 534/885; 534/553; 534/559; 534/565; 534/573; 534/838; 534/850
[58] Field of Search ................... 534/553, 559, 534/565, 885, 573 M, 838, 850

[56] References Cited

U.S. PATENT DOCUMENTS

| | | |
|---|---|---|
| T. 860,001 | 3/1969 | Gessler et al. . |
| 2,121,535 | 6/1938 | Amon ........................................ 134/58 |
| 2,156,591 | 5/1939 | Jacobson . |
| 2,502,254 | 3/1950 | Glassman . |
| 2,514,236 | 7/1950 | Glassman ............................... 106/289 |
| 2,625,492 | 1/1953 | Young . |
| 2,833,736 | 5/1958 | Glaser . |
| 3,011,902 | 12/1961 | Jordan ..................................... 106/307 |
| 3,025,259 | 3/1962 | Watson et al. ........................... 524/832 |
| 3,043,708 | 7/1962 | Watson et al. ........................... 106/307 |
| 3,335,020 | 8/1967 | Aboytes et al. ........................ 252/430 |
| 3,479,300 | 11/1969 | Rivin et al. ............................. 252/430 |
| 3,528,840 | 9/1970 | Aboytes . |
| 3,607,813 | 9/1971 | Purcell . |
| 3,674,670 | 7/1972 | Erikson et al. . |
| 3,686,111 | 8/1972 | Makhlouf et al. ...................... 260/31.2 |
| 3,846,141 | 11/1974 | Ostergren et al. . |
| 3,876,603 | 4/1975 | Makhlouf . |
| 4,003,751 | 1/1977 | Carder . |
| 4,006,031 | 2/1977 | Ferch et al. . |
| 4,014,833 | 3/1977 | Story . |
| 4,014,844 | 3/1977 | Vidal et al. ......................... 106/307 X |
| 4,061,830 | 12/1977 | Greenberg . |
| 4,176,361 | 11/1979 | Kawada et al. . |
| 4,204,871 | 5/1980 | Johnson et al. . |
| 4,204,876 | 5/1980 | Bowden . |
| 4,290,072 | 9/1981 | Manusukhani . |
| 4,293,394 | 10/1981 | Darlington et al. . |
| 4,308,061 | 12/1981 | Iwahashi et al. . |
| 4,328,041 | 5/1982 | Wilson ................................. 106/308 Q |
| 4,442,256 | 4/1984 | Miller . |
| 4,451,597 | 5/1984 | Victorius . |
| 4,476,270 | 10/1984 | Brasen et al. . |
| 4,478,905 | 10/1984 | Neely, Jr. . |
| 4,503,174 | 3/1985 | Vasta . |
| 4,503,175 | 3/1985 | Houze et al. . |
| 4,525,521 | 6/1985 | Denhariog . |
| 4,525,570 | 6/1985 | Blum et al. . |
| 4,530,961 | 7/1985 | Nguyen et al. ........................ 524/832 |
| 4,544,687 | 10/1985 | Schupp et al. . |
| 4,555,535 | 11/1985 | Bednarek et al. . |
| 4,556,427 | 12/1985 | Lewis . |
| 4,597,794 | 7/1986 | Ohta et al. . |
| 4,605,596 | 8/1986 | Fry . |
| 4,620,993 | 11/1986 | Suss et al. . |
| 4,620,994 | 11/1986 | Suss et al. . |
| 4,650,718 | 3/1987 | Simpson et al. . |
| 4,659,770 | 4/1987 | Vasta . |
| 4,665,128 | 5/1987 | Cluff et al. . |
| 4,680,204 | 7/1987 | Das et al. . |
| 4,681,811 | 7/1987 | Simpson et al. . |
| 4,692,481 | 9/1987 | Kelly . |
| 4,710,543 | 12/1987 | Chattha et al. . |
| 4,713,427 | 12/1987 | Chattha et al. . |
| 4,719,132 | 1/1988 | Porter, Jr. . |

(List continued on next page.)

FOREIGN PATENT DOCUMENTS

| | | |
|---|---|---|
| 272127 | 6/1988 | European Pat. Off. . |
| 433229 | 6/1991 | European Pat. Off. . |
| 0441987 | 8/1991 | European Pat. Off. . |
| 410152 | 2/1994 | European Pat. Off. . |
| 636591 | 2/1995 | European Pat. Off. . |
| 1164786 | 10/1958 | France . |
| 1215895 | 4/1960 | France . |
| 1224131 | 4/1960 | France . |
| 2477593 | 11/1981 | France . |
| 2564489 | 10/1986 | France . |
| 2607528 | 6/1988 | France . |
| 3170748 | 7/1985 | Germany . |
| 59-82467 | 5/1984 | Japan . |
| 01-275666 | 11/1989 | Japan . |
| 05-271365 | 8/1993 | Japan . |
| 5339516 | 12/1993 | Japan . |
| 6025572 | 2/1994 | Japan . |
| 06-025572 | 2/1994 | Japan . |
| 6067421 | 3/1994 | Japan . |
| 6073235 | 3/1994 | Japan . |
| 862018 | 3/1961 | United Kingdom . |
| WO92/13983 | 8/1992 | WIPO ..................................... 534/553 |

OTHER PUBLICATIONS

Moschopedis et al, Chemical Abstracts, vol. 61, # 11805e–f (1964).

S. Wolff et al., "The Influence of Modified carbon Blacks on Viscoelastic Compound Properties" Kautschuk & Gummi, Kunststoffe 44, Jahrgang, Nr. Oct. 1991, pp. 941–947.

C. Bourdillon, "Immobilization of glucose oxidase on a carbon surface derivatized by electrochemical reduction of diazonium salts" J. Electroanal. Chem., 336 (1992) 113–123.

S. E. Moschopedis et al., "The Reaction of Diazonium Salts with Humic Acids and Coals: Evidence for Activated Methylene Bridges in Coals and Humic Acids" Fuel 43(4) at pp. 289–298 (1964).

Ullmann's Encyclopedia of Industrial Chemistry, vol. A8, pp. 508–509.

(List continued on next page.)

Primary Examiner—Floyd D. Higel

[57] ABSTRACT

Processes for preparing a carbon product having an organic group attached to a carbon material. The carbon material is selected from graphite powder, a graphite fiber, a carbon fiber, a carbon cloth, a vitreous carbon product, and an activated carbon product. In one process at least one diazonium salt reacts with a carbon material in the absence of an externally applied electric current sufficient to reduce the diazonium salt. In another process at least one diazonium salt reacts with a carbon material in a protic reaction medium.

19 Claims, No Drawings

U.S. PATENT DOCUMENTS

| | | |
|---|---|---|
| 4,727,100 | 2/1988 | Vasta . |
| 4,741,780 | 5/1988 | Atkinson ................................. 106/300 |
| 4,752,532 | 6/1988 | Starka . |
| 4,764,430 | 8/1988 | Blackburn et al. . |
| 4,770,706 | 9/1988 | Pietsch . |
| 4,789,400 | 12/1988 | Sciodar et al. . |
| 4,798,745 | 1/1989 | Martz et al. . |
| 4,798,746 | 1/1989 | Claar et al. . |
| 4,808,656 | 2/1989 | Kania et al. . |
| 4,820,751 | 4/1989 | Takeshita et al. . |
| 4,840,674 | 6/1989 | Schwarz . |
| 4,853,037 | 8/1989 | Johnson et al. . |
| 4,883,838 | 11/1989 | Jung et al. . |
| 4,908,397 | 3/1990 | Barsotti et al. . |
| 4,914,148 | 4/1990 | Hille et al. . |
| 4,927,868 | 5/1990 | Schimmel et al. . |
| 4,975,474 | 12/1990 | Barsotti et al. . |
| 4,994,520 | 2/1991 | Mori . |
| 5,008,335 | 4/1991 | Pettit, Jr. . |
| 5,017,435 | 5/1991 | Barsotti et al. . |
| 5,026,755 | 6/1991 | Kveglis et al. . |
| 5,051,464 | 9/1991 | Johnson . |
| 5,064,719 | 11/1991 | Den Hartog et al. . |
| 5,066,733 | 11/1991 | Martz et al. . |
| 5,076,843 | 12/1991 | Acitelli et al. . |
| 5,093,391 | 3/1992 | Barsotti et al. . |
| 5,093,407 | 3/1992 | Komai et al. . |
| 5,100,470 | 3/1992 | Hindagolla et al. . |
| 5,106,417 | 4/1992 | Hauser et al. . |
| 5,109,055 | 4/1992 | Nagasaki . |
| 5,114,477 | 5/1992 | Mort et al. . |
| 5,122,552 | 6/1992 | Johnson . |
| 5,130,004 | 7/1992 | Johnson et al. . |
| 5,130,363 | 7/1992 | Scholl et al. . |
| 5,141,556 | 8/1992 | Matrick . |
| 5,152,801 | 10/1992 | Altermatt . |
| 5,159,009 | 10/1992 | Wolff et al. . |
| 5,168,106 | 12/1992 | Babcock et al. . |
| 5,173,111 | 12/1992 | Krishnan et al. . |
| 5,179,191 | 1/1993 | Jung et al. . |
| 5,182,355 | 1/1993 | Martz et al. . |
| 5,184,148 | 2/1993 | Suga et al. . |
| 5,190,582 | 3/1993 | Shinozuka et al. . |
| 5,200,164 | 4/1993 | Medalia et al. ................................ 423/265 |
| 5,204,404 | 4/1993 | Werner, Jr. et al. . |
| 5,206,295 | 4/1993 | Harper et al. . |
| 5,221,581 | 6/1993 | Palmer et al. . |
| 5,229,452 | 7/1993 | Green et al. . |
| 5,232,974 | 8/1993 | Branan, Jr. et al. . |
| 5,236,992 | 8/1993 | Bush . |
| 5,242,751 | 9/1993 | Hartman . |
| 5,266,361 | 11/1993 | Shwarte et al. . |
| 5,266,406 | 11/1993 | Den Hartog et al. . |
| 5,276,097 | 1/1994 | Hoffmann et al. . |
| 5,281,261 | 1/1994 | Lin ..................................... 106/20 R |
| 5,286,286 | 2/1994 | Winnik et al. . |
| 5,288,788 | 2/1994 | Shieh et al. . |
| 5,290,848 | 3/1994 | Palmer et al. . |
| 5,302,197 | 4/1994 | Wickramanayke et al. . |
| 5,310,778 | 5/1994 | Shor et al. . |
| 5,314,945 | 5/1995 | Nickle et al. . |
| 5,314,953 | 5/1994 | Corcoran et al. . |
| 5,319,044 | 6/1994 | Jung et al. . |
| 5,320,738 | 6/1994 | Kaufman . |
| 5,324,790 | 6/1994 | Manring . |
| 5,334,650 | 8/1994 | Serdiuk et al. . |
| 5,336,716 | 8/1994 | Kappes et al. . |
| 5,336,753 | 8/1994 | Jung et al. . |
| 5,352,289 | 10/1994 | Weaver et al. . |
| 5,356,973 | 10/1994 | Taljan et al. . |
| 5,366,828 | 11/1994 | Struthers . |
| 5,401,313 | 3/1995 | Supplee et al. ................................ 106/712 |

OTHER PUBLICATIONS

J. B. Donnet et al., "Chimie Superficielle Et Sites Privilégiés Des Charges Fines" Conference presentee aux Journees du Caoutehoue, Conference Internationale des Arts Chimiques, 22–23, pp. 5–12, (Jun. 1959).

V. A. Garten et al., "Nature Of Chemisorptive Mechanisms In Rubber Reinforcement", Commonwealth Scientific and Industrial Research Organ., Div. Of Industrial Chem., Melbourne, Australia, pp. 596–609.

J. W. Watson, "Chemical Aspects Of Reinforcement", Compounding Research Dept., Dunlop Research Center, Dunlop Rubber Co., pp. 987–999.

K. Ohkita, et al., "The Reaction of Carbon Black Surface With 2,2–Diphenyl–1–picrylhydrazyl", CAR, vol. 10, No. 5, (1972) pp. 631–636.

M. L. Studebaker et al., "Oxygen–Containing Groups On The Surface Of Carbon Black", Industrial and Eng. and Chem., vol. 48, No. 1, pp. 162–166.

T. Yamaguchi et al., "Novel Carbon Black/Rubber Coupling Agent", Kautschuk and Gummi, Kunststoffe 42, Jahrgang Nr. May 1989, pp. 403–409.

J. Am. Chem. Soc. 1992, 114, 5883–5884, vol. 114 Delamar et al.

J. B. Donnet et al., "Aroxylic Structure Of The Quinone Groups And Of The Free Radicals Present On Carbon Black Surfaces", Rev. Gen. Caoutchous Plasticques, vol. 42, No. 3, (1965), pp. 389–392. (w/Abstract).

J. B. Donnet et al., "Radical Reactions And Surface Chemistry Of Carbon Black", Bull. Soc. Chim. (1960) (Abstract only).

RAPRA Abstract 432845: Compounding Heat Resistant Non–Black EPDM Rubber, PPG Industries.

RAPRA Abstract 417612, D. C. Edwards, "Review: Polymer–Filler Interactions In Rubber Reinforcement", J. Mat. Sci., vol. 25, No. 10, (1990) pp. 4175–4185.

Gregory, Peter, "Ink Jet Printing", High–Technology Applications of Organic Colorants, Chapter 9, (1991).

RAPRA Abstract 403202, D. Siller, "Organotitanate, Zirconate Effect On Elastomers", Rubb. Plast. News, vol. 19, No. 24, (1990), pp. 14–27.

RAPRA Abstract 390600, H. Okamoto, "Application Of Coupling Agents To Elastomers", Nippon Gomu Kyokaishi, vol. 62, No. 12, (1989) pp. 819–833.

RAPRA Abstract 394030, P. Flink et al., "Mechanical Properties Of Natural Rubber/Grafted Cellulose Fibre Composites", Brit. Polym. J., vol. 22, No. 2, 1990, pp. 147–153.

Tsubokawa et al., "Grafting Onyo Carbon Black Having Few Functional Group" Shikizai Kyokaisha, vol. 66, No. 5, (1993) (Abstract Only).

R. H. Leach et al., "The Printing Processes", The Printing Ink Manual, Chapter 2, Fourth Edition.

R. H. Leach et al., "Gravure Inks", The Printing Ink Manual, Chapters 8–10, Fifth Edition (1988).

N. Tsubokawa, "Functionalization Of Carbon Black By Surface Grafting Of Polymers", Dept. Of Material and Chemical Eng., pp. 417–470.

"Ink Jet Printing: 1994 Overview and Outlook Supplied", Chapter 7.

Andreattola, Ink Jet Ink Technology, pp. 533–534.

Major, Micheal J., "Formulating The Future of Automotive Coatings", Modern Paint and Coatings, pp. 34–36, (1992).

Greenfield, David, "Fewer Formulation Options Lead to Emphasis on Familiar", Modern Paint and Coatings, pp. 40–42, (1992).

Schrantz, Joe, "Automotive Coatings", Modern Paint and Coatings pp. 22–31, (1994).

"Regulations Focus Formulator Attention on Additives", Modern Paint and Coatings, pp. 32–36, (1994).

Sherrer, Robert, "Coloration Of Ink Jet Inks", BLS Ink Jet Printing Conference, Oct. 10–12, (1994), Monterey CA.

Allen, Ross, "Thermal Ink Jet Printing Trends and Advances", BLS Ink Jet Printing Conference, Oct. 10–12, (1994) Monterey, CA.

Schneider, John, "Continuous Ink Jet", BLS Ink Jet Printing Conference Oct. 10–12 (1994) Monterey, CA.

Abstract 388935, R. Mushack, "Light–Colored Fillers In Polymers", Gummi Fas. Kinst., vol. 42, No. 11, (1989), pp. 584–592.

Abstract 301034, J. Y. Germain et al., "Carbon Black Is Better With Silica" Rubb. World, vol. 193, No. 1, (1985), pp. 51–54.

Abstract 343229, "White And Black Fillers For Rubber Compounds", Ind.d. Gomma, vol. 30, No. 12, (1986) pp. 23–54.

Abstract 177481, L. Corbelli, "Ethylene–Propylene Rubbers", London Applied Science Publishers Ltd., (1981) Chapter 4, pp. 87–129.

Abstract 105623, G. Sugerman et al., "Putting Performance Into Thermosets With Titanium Coupling Agents", Cleveland, Ohio, (1976), pp. 106–113.

Abstract 056893, M. W. Ranney et al., "Applications For Silane Coupling Agents In The Automotive Industry", Kaut. U. Gummi Kunst., vol. 28, No. 10, (1975), pp. 597–608.

Abstract 002608, H. E. Haxo et al., "Ground Rice Hull Ash As A Filler For Rubber", Philadelphia, Paper No. 8, (1974), p. 41, Preprint .012.

Abstract 000937, G. M. Cameron et al., "Reduction Of Hear Build–Up In Mineral–Filled Elastomers Through The Use Of Silane Coupling Agents", Gothenburg, (44) (1973) Ser. Sec. 012.

Abstract 86056110, "Putting Performance Into Thermosets With Titanium Coupling Agents", G. Sugerman et al., High Performance Plast. National Tech. Conference, Soc. Plast. Eng.

H. Zoheidi et al., "Role Of Oxygen Surface Groups In Catalysts Of Hydrogasification Of Carbon Black By Potassium Carbonate," Carbon vol. 25, No. 6, (1987), pp. 809–819.

J. D. Roberts et al., "Basic Principles of Organic Chemistry," p. 108.

PROCESS FOR PREPARING CARBON MATERIALS WITH DIAZONIUM SALTS AND RESULTANT CARBON PRODUCTS

FIELD OF THE INVENTION

This invention relates to a process for the preparation of carbon products. The process involves reacting a diazonium salt with a carbon material to yield a carbon product having an organic group attached to the carbon material. The carbon material is selected from graphite powder, a graphite fiber, a carbon fiber, a carbon cloth, a vitreous carbon product, and an activated carbon product.

BACKGROUND OF THE INVENTION

Carbon materials are used in a wide variety of industries and products. These carbon materials include, for example, graphite powder, graphite fibers, carbon fibers, carbon cloth, vitreous carbon products, and an activated carbon products. Many of the uses of these carbon materials are discussed below.

Graphite powder, in addition to its use as "lead" in pencils, has many uses in a variety of fields, including electrical, chemical, metallurgical and rocket components. Electrodes formed from graphite are used in steel-making furnaces and in the electrolytic production of chlorine, chlorates, magnesium, and sodium. Graphite is also used to make metallurgical molds and crucibles and chemical reaction vessels. In the field of rockets, graphite is used to make rocket motor nozzles and missile nose cones.

Graphite fibers and carbon fibers are similarly used in a variety of applications. Short or chopped fibers are often used as reinforcement in injection moldings, as well as in automotive brakes, where their good abrasion resistance is desired. High-performance graphite or carbon fibers are used in structural composites, particularly composites utilized by the aerospace field. These fibers also see widespread use in sporting goods such as fishing rods, golf clubs, and tennis rackets.

Carbon cloth or mats are simply textile products formed from long fibers of carbon or graphite. They are useful in areas such as electrostatic dissipation in carpets or computer-related furniture, electromagnetic shielding, and electrostatic painting of sheet-molded automotive parts. The low thermal conductivity also finds uses the field of rocket components.

Vitreous carbon is used in the manufacture of electrical goods such as electrodes and mechanical goods such as crucibles.

Activated carbon exhibits excellent adsorption properties and is therefore used to improve the color of manufactured chemicals, oils, and fats, to control the color, odor, and taste of water, beverages, and food. These gas-adsorbent carbons are also useful in gas separation processes, the recovery of solvent vapors, air conditioning systems, and gas masks.

Much effort has been expended over the last several decades to modify the surface chemistry of carbon materials. While it is possible to deposit physically adsorbed material onto the surface of a carbon material, permanently changing its surface chemistry is substantially more difficult.

PCT Patent Application No. WO 92/13983 describes a process for modifying the surfaces of carbon-containing materials by electrochemical reduction of diazonium salts. The process is reportedly applicable, in particular, to carbon plates and carbon fibers for composite materials. Carbon-containing materials modified by the process are also described. Electrochemical reduction of diazonium salts containing functionalized aryl radicals to covalently modify carbon surfaces is also described in Delmar et al., *J. Am. Chem. Soc.* 1992, 114, 5883–5884.

According to WO 92/13983, the process for modifying the surface of a carbon-containing material consists of grafting an aromatic group to the surface of this material by electrochemical reduction of a diazonium salt including this aromatic group. The carbon-containing material is placed in contact with a diazonium salt solution in an aprotic solvent and is negatively charged with respect to an anode which is also in contact with the diazonium salt solution. Use of a protic solvent is reported to prevent the electrochemical process from producing the intended product as a result of reducing the diazonium triple bond to yield a hydrazine.

Despite that technology, there remains a need to modify the surface chemistry of carbon materials and impart desired properties to carbon materials.

SUMMARY OF THE INVENTION

Accordingly, the present invention relates to processes for preparing a carbon product having an organic group attached to a carbon material selected from a graphite powder, a graphite fiber, a carbon fiber, a carbon cloth, a vitreous carbon product, and an activated carbon product. One process comprises the step of reacting at least one diazonium salt with a carbon material in the absence of an externally applied electric current sufficient to reduce the diazonium salt.

Another process comprises the step of reacting at least one diazonium salt with a carbon material in a protic reaction medium.

The description which follows sets out additional features and advantages of the invention. These functions will be apparent from that description or may be learned by practice of the invention as described. The objectives and other advantages will be realized and attained by the processes, products, and compositions particularly pointed out in the description below and the appended claims.

DETAILED DESCRIPTION

Processes for Preparing a Carbon Product

A first embodiment of the invention provides processes for preparing a carbon product having an organic group attached to a carbon material. The carbon material is selected from a graphite powder, a graphite fiber, a carbon fiber, a carbon cloth, a vitreous carbon product, and an activated carbon product.

One process involves the reaction of at least one diazonium salt with a carbon material in the absence of an externally applied current sufficient to reduce the diazonium salt. That is, the reaction between the diazonium salt and the carbon material proceeds without an external source of electrons sufficient to reduce the diazonium salt. Mixtures of different diazonium salts may be used in the processes of the invention. This process can be carried out under a variety of reaction conditions and in any type of reaction medium, including both protic and aprotic solvent systems or slurries.

Another process reacts at least one diazonium salt with a carbon material in a protic reaction medium. Mixtures of different diazonium salts may be used in this process of the invention. This process can also be carried out under a variety of reaction conditions.

Preferably, in both processes, the diazonium salt is formed in situ. If desired, in either process, the carbon product can be isolated and dried by means known in the art. Furthermore, the resultant carbon product can be treated to remove impurities by known techniques. The various preferred embodiments of these processes are discussed below and are shown in the examples.

The carbon materials used in the processes of this invention are carbon material selected from a graphite powder, a graphite fiber, a carbon fiber, a carbon cloth, a vitreous carbon product, and an activated carbon product. The resulting carbon products are useful in applications known for untreated carbon materials such as those discussed above. More importantly, the processes of this invention can be used to prepare carbon products having advantageous properties not associated with untreated carbon materials.

The processes of the invention can be carried out under a wide variety of conditions and in general are not limited by any particular condition. The reaction conditions must be such that the particular diazonium salt is sufficiently stable to allow it to react with the carbon material. Thus, the processes can be carried out under reaction conditions where the diazonium salt is short lived. The reaction between the diazonium salt and the carbon material occurs, for example, over a wide range of pH and temperature. The processes can be carried out at acidic, neutral, and basic pH. Preferably, the pH ranges from about 1 to 9. The reaction temperature may preferably range from 0° C. to 100° C.

Diazonium salts, as known in the art, may be formed for example by the reaction of primary amines with aqueous solutions of nitrous acid. A general discussion of diazonium salts and methods for their preparation is found in Morrison and Boyd, *Organic Chemistry*, 5th Ed., pp. 973–983, (Allyn and Bacon, Inc. 1987) and March, *Advanced Organic Chemistry: Reactions, Mechanisms, and Structures*, 4th Ed., (Wiley, 1992). According to this invention, a diazonium salt is an organic compound having one or more diazonium groups.

In the processes of the invention, the diazonium salt may be prepared prior to reaction with the carbon material or, more preferably, generated in situ using techniques known in the art. In situ generation also allows the use of unstable diazonium salts such as alkyl diazonium salts and avoids unnecessary handling or manipulation of the diazonium salt. In particularly preferred processes of this invention, both the nitrous acid and the diazonium salt are generated in situ.

A diazonium salt, as is known in the art, may be generated by reacting a primary amine, a nitrite and an acid. The nitrite may be any metal nitrite, preferably lithium nitrite, sodium nitrite, potassium nitrite, or zinc nitrite, or any organic nitrite such as for example isoamylnitrite or ethylnitrite. The acid may be any acid, inorganic or organic, which is effective in the generation of the diazonium salt. Preferred acids include nitric acid, $HNO_3$, hydrochloric acid, HCl, and sulfuric acid, $H_2SO_4$.

The diazonium salt may also be generated by reacting the primary amine with an aqueous solution of nitrogen dioxide. The aqueous solution of nitrogen dioxide, $NO_2/H_2O$, provides the nitrous acid needed to generate the diazonium salt.

Generating the diazonium salt in the presence of excess HCl may be less preferred than other alternatives because HCl is corrosive to stainless steel. Generation of the diazonium salt with $NO_2/H_2O$ has the additional advantage of being less corrosive to stainless steel or other metals commonly used for reaction vessels. Generation using $H_2SO_4/NaNO_2$ or $HNO_3/NaNO_2$ are also relatively non-corrosive.

In general, when generating a diazonium salt from a primary amine, a nitrite, and an acid, two equivalents of acid are required based on the amine. In an in situ process, the diazonium salt can be generated using one equivalent of the acid. When the primary amine contains a strong acid group, adding a separate acid may not be necessary in the processes of the invention. The acid group or groups of the primary amine can supply one or both of the needed equivalents of acid. When the primary amine contains a strong acid group, preferably zero to one equivalent of additional acid is added to a process of the invention to generate the diazonium salt in situ. One example of such a primary amine is para-aminobenzenesulfonic acid (sulfanilic acid).

In general, diazonium salts are thermally unstable. They are typically prepared in solution at low temperatures, such as 0°–5° C., and used without isolation of the salt. Heating solutions of some diazonium salts may liberate nitrogen and form either the corresponding alcohols in acidic media or the organic free radicals in basic media.

However, to accomplish the process of the invention, the diazonium salt need only be sufficiently stable to allow reaction with the carbon material. Thus, the processes of the present invention can be carried out with some diazonium salts otherwise considered to be unstable and subject to decomposition. Some decomposition processes may compete with the reaction between the carbon material and the diazonium salt and may reduce the total number of organic groups attached to the carbon material. Further, the reaction may be carried out at elevated temperatures where many diazonium salts may be susceptible to decomposition. Elevated temperatures may also advantageously increase the solubility of the diazonium salt in the reaction medium and improve its handling during the process. However, elevated temperatures may result in some loss of the diazonium salt due to other decomposition processes.

The processes of the invention can be accomplished by adding the reagents to form the diazonium salt in situ, to a mixture or suspension of the carbon material in the reaction medium, for example, water. Thus, a mixture or suspension to be used in a process of the invention may already contain one or more reagents to generate the diazonium salt and the process of the invention accomplished by adding the remaining reagents.

Reactions to form a diazonium salt are compatible with a large variety of functional groups commonly found on organic compounds. Thus, only the availability of a diazonium salt for reaction with a carbon material limits the processes of the invention.

The processes of this invention can be carried out in any reaction medium which allows the reaction between the diazonium salt and the carbon material to proceed. Preferably, the reaction medium is a solvent-based system. The solvent may be a protic solvent, an aprotic solvent, or a mixture of solvents. Protic solvents are solvents, like water or methanol, containing a hydrogen attached to an oxygen or nitrogen and thus are sufficiently acidic to form hydrogen bonds. Aprotic solvents are solvents which do not contain acidic hydrogen. Aprotic solvents include, for example, solvents such as hexanes, tetrahydrofuran (THF), acetonitrile, and benzonitrile. For a discussion of protic and aprotic solvents see Morrison and Boyd, *Organic Chemistry*, 5th Ed., pp. 228–231, (Allyn and Bacon, Inc. 1987).

The processes of this invention are preferably carried out in a protic reaction medium, that is in a protic solvent alone or a mixture of solvents which contains at least one protic solvent. Preferred protic media include, but are not limited to water, aqueous media containing water and other solvents, alcohols, and any media containing an alcohol, or mixtures of such media.

In general, the processes of the invention produce inorganic by-products, such as salts. In some end uses, such as those discussed below, these by-products may be undesirable and problematic. Several possible ways to produce a carbon product according to a process of the invention without unwanted inorganic by-products or salts are as follows:

First, the diazonium salt can be purified before use by removing the unwanted inorganic by-products using means known in the art. Second, the diazonium salt can be generated with the use of an organic nitrite as the diazotization agent yielding the corresponding alcohol rather than an inorganic salt. Third, when the diazonium salt is generated from an amine having an acid group and aqueous $NO_2$, no inorganic salts are formed. Fourth, the inorganic by-products may be removed by washing with a suitable solvent. Other ways may be known to those of skill in the art.

In addition to the inorganic by-products, a process of the invention may also produce organic by-products. They can be removed, for example, by extraction with organic solvents. Other ways may be known to those of skill in the art.

Carbon Products

The reaction between a diazonium salt and a carbon material according to a process of this invention forms a carbon product having an organic group attached to the carbon material selected from a graphite powder, a graphite fiber, a carbon fiber, a carbon cloth, a vitreous carbon product, and an activated carbon product. The diazonium salt may contain the organic group to be attached to the carbon black. The organic group may be an aliphatic group, a cyclic organic group, or an organic compound having an aliphatic portion and a cyclic portion. As discussed above, the diazonium salt employed in the processes of the invention can be derived from a primary amine having one of these groups and being capable of forming, even transiently, a diazonium salt. The organic group may be substituted or unsubstituted, branched or unbranched. Aliphatic groups include, for example, groups derived from alkanes, alkenes, alcohols, ethers, aldehydes, ketones, carboxylic acids, and carbohydrates. Cyclic organic groups include, but are not limited to, alicyclic hydrocarbon groups (for example, cycloalkyls, cycloalkenyls), heterocyclic hydrocarbon groups (for example, pyrrolidinyl, pyrrolinyl, piperidinyl, morpholinyl, and the like), aryl groups (for example, phenyl, naphthyl, anthracenyl, and the like), and heteroaryl groups (imidazolyl, pyrazolyl, pyridinyl, thienyl, thiazolyl, furyl, indolyl, and the like). As the steric hinderance of a substituted organic group increases, the number of organic groups attached to the carbon material from the reaction between the diazonium salt and the carbon material may be diminished.

When the organic group is substituted, it may contain any functional group compatible with the formation of a diazonium salt. Examples include, but are not limited to, OR, COR, COOR, OCOR, COONa, COOK, $COO^-NR_4^+$, halogen, CN, $NR_2$, $S_n$, $SO_3H$, $SO_3Na$, $SO_3K$, $SO_3^-NR_4^+$, NR(COR), $CONR_2$, $NO_2$, $PO_3H_2$, $PO_3HNa$, $PO_3Na_2$, N=NR, $NR_3^+X^-$, and $PR_3^+X^-$. R is independently hydrogen, $C_1$–$C_{20}$ alkyl (branched or unbranched) or aryl. The integer n ranges from 1–8 and preferably from 2–4. The anion $X^-$ is a halide or an anion derived from a mineral or organic acid.

An example of an organic group is an aromatic group of the formula $A_yAr$—, which corresponds to a primary amine of the formula $A_yArNH_2$. In this formula, the variables have the following meanings: Ar is an aromatic radical selected from the group consisting of phenyl, naphthyl, anthracenyl, phenanthrenyl, biphenyl, and pyridinyl; A is a substituent on the aromatic radical independently selected from a preferred functional group described above or A is a linear, branched or cyclic hydrocarbon radical (preferably containing up to 20 carbons), unsubstituted or substituted with one or more of those functional groups; and y is an integer from 1 to 5 when Ar is phenyl, 1 to 7 when Ar is naphthyl, 1 to 9 when Ar is anthracenyl, phenanthrenyl, or biphenyl, or 1 to 4 when Ar is pyridinyl.

Another set of organic groups which may be attached to the carbon material are organic groups substituted with an ionic or an ionizable group as a functional group. An ionizable group is one which is capable of forming an ionic group in the medium of use. The ionic group may be an anionic group or a cationic group and the ionizable group may form an anion or a cation.

Ionizable functional groups forming anions include, for example, acidic groups or salts of acidic groups. The organic groups, therefore, include groups derived from organic acids. Preferably, when it contains an ionizable group forming an anion, such an organic group has a) an aromatic group and b) at least one acidic group having a pKa of less than 11, or at least one salt of an acidic group having a pKa of less than 11, or a mixture of at least one acidic group having a pKa of less than 11 and at least one salt of an acidic group having a pKa of less than 11. The pKa of the acidic group refers to the pKa of the organic group as a whole, not just the acidic substituent. More preferably, the pKa is less than 10 and most preferably less than 9. Preferably, the aromatic group of the organic group is directly attached to the carbon black. The aromatic group may be further substituted or unsubstituted, for example, with alkyl groups. More preferably, the organic group is a phenyl or a naphthyl group and the acidic group is a sulfonic acid group, a sulfinic acid group, a phosphonic acid group, or a carboxylic acid group. Examples of these acidic groups and their salts are discussed above. Most preferably, the organic group is a substituted or unsubstituted sulfophenyl group or a salt thereof; a substituted or unsubstituted (polysulfo)phenyl group or a salt thereof; a substituted or unsubstituted sulfonaphthyl group or a salt thereof; or a substituted or unsubstituted (polysulfo)naphthyl group or a salt thereof. A preferred substituted sulfophenyl group is hydroxysulfophenyl group or a salt thereof.

Specific organic groups having an ionizable functional group forming an anion (and their corresponding primary amines for use in a process according to the invention) are p-sulfophenyl (p-sulfanilic acid), 4-hydroxy-3-sulfophenyl (2-hydroxy-5-amino-benzenesulfonic acid), and 2-sulfoethyl (2-aminoethanesulfonic acid).

Amines represent examples of ionizable functional groups that form cationic groups. For example, amines may be protonated to form ammonium groups in acidic media. Preferably, an organic group having an amine substituent has a pKb of less than 5. Quaternary ammonium groups ($—NR_3^+$) and quaternary phosphonium groups ($—PR_3^+$) also represent examples of cationic groups. Preferably, the organic group contains an aromatic group such as a phenyl or a naphthyl group and a quaternary ammonium or a quaternary phosphonium group. The aromatic group is preferably directly attached to the carbon black. Quaternized cyclic amines, and even quaternized aromatic amines, can also be used as the organic group. Thus, N-substituted pyridinium compounds, such as N-methyl-pyridyl, can be used in this regard.

An advantage of the carbon materials having an attached organic group substituted with an ionic or an ionizable group is that the carbon product may have increased water dispersibility relative to the corresponding untreated carbon material. In addition to their water dispersibility, carbon products having an organic group substituted with an ionic or an ionizable group may also be dispersible in polar organic solvents such as dimethylsulfoxide (DMSO), and formamide.

Water dispersibility of a carbon product increase as the number of organic groups having an ionizable group attached to the carbon material increases or a greater number of ionizable groups are attached to a given organic group. Thus, increasing the number of ionizable groups associated with the carbon product should increase its water dispersibility. It can be noted that the water dispersibility of a carbon product containing an amine as the organic group attached to the carbon material may be increased by acidifying the aqueous medium. Because the water dispersibility of the carbon product depends to some extent on charge stabilization, it is preferable that the ionic strength of the aqueous medium be less than 0.1 molar. More preferably, the ionic strength is less than 0.01 molar.

When such a water dispersible carbon product is prepared by a process of the invention, it is preferred that the ionic or ionizable groups be ionized in the reaction medium. Alternatively, the carbon product may be dried by techniques used for conventional carbon materials. Overdrying, however, may cause a loss in the degree of water dispersibility.

Aromatic sulfides encompass another group of preferred organic groups. Carbon products having aromatic sulfide groups are particularly useful in rubber compositions or other compositions having reactive olefinic groups. These aromatic sulfides can be represented by the formulas —Ar—$S_n$—Ar'— or —Ar—$S_n$—Ar" wherein Ar and Ar' are independently arylene groups, Ar" is an aryl and n is 1 to 8. Preferred arylene groups include phenylene groups, particularly p-phenylene groups. Preferred aryl groups include phenyl and naphthyl. The number of sulfurs present, defined by n, and preferably ranges from 2 to 4. Particularly preferred aromatic sulfide groups are bis-para-$(C_6H_4)$—$S_2$—$(C_6H_4)$— and para-$(C_6H_4)$—$S_2$—$(C_6H_{56})$. The diazonium salts of these aromatic sulfide groups may be conveniently prepared from their corresponding primary amines, $H_2N$—Ar—$S_n$—Ar'—$NH_2$ or $H_2N$—Ar—$S_x$—Ar".

Uses of the Carbon Products

The carbon products of this invention may be used in the same applications as the corresponding untreated carbon materials. The organic groups attached to the carbon material, however, can be used to modify and improve the properties of a given carbon material for a particular use. The organic groups may also be chosen for linking to a substrate in which a given carbon material is used. This linking may take the form of reacting with the substrate through a process such as, for example, vulcanization, neutralization, complexation, or polymerization. An example is a carbon material having $NH_2$ groups for use in epoxy resin-based materials.

The following examples are intended to illustrate not limit, the invention.

The methods described in "Absorption, Surface Area and Porosity"; S. J. Gregg, K. S. W. Sing (Academic Press 1982) were used to measure surface areas and pore volumes. Surface area, non-porous surface area, and pore volume of activated carbon was determined as described on pages 90–97. The surface area of the carbon cloth was determined using step-like isotherms as described on pages 84–86. Surface area of the graphite fibers were determined by BET techniques using krypton.

EXAMPLE 1

Preparation of a Graphite Powder Product

This example illustrates the preparation of a graphite powder product using a process of the present invention. A 2.0 g sample of a graphite powder having a surface area of 11.5 $m^2/g$ was stirred in 14 g of water. A solution of 0.11 g of 4-chlorobenzenediazonium hexafluorophosphate in 7 g of water was added, and bubbles were released. After stirring for 20 minutes, the product was collected by filtration, subjected to Soxhlet extraction with tetrahydrofuran (THF) overnight, and dried in an oven. An analysis of the product showed that it contained 597 ppm of chlorine, compared to 23 ppm of chlorine for the untreated powder. Therefore, the product contains 0.85 chlorophenyl groups per square nanometer of surface. ESCA analysis showed the product contained 1.4 atomic percent chlorine. No chlorine was detected on the surface of the unreacted powder by ESCA.

EXAMPLE 2

Preparation of a Graphite Powder Product

This example illustrates the preparation of a graphite powder product using a process of the present invention. A solution of 0.095 g 4-nitrobenzenediazonium tetrafluoroborate in 10 g of water was added to a stirring suspension of 2.0 g of the graphite powder of Example 1 in 18 g of water. After stirring for 15 minutes, the product was dried in an oven at 125° C., subjected to Soxhlet extraction overnight with THF and dried. ESCA analysis showed a N1s signal at 406.1 eV and one at 400.5 eV with relative areas of 5.9:1. The 406.1 eV signal is caused by $NO_2$ groups and the 400.5 eV is probably caused by azo groups. No signal at 403 eV corresponding to diazonium groups was found. The combined nitrogen content was 4.0 atomic percent. No nitrogen was detected on the unreacted powder by ESCA. This establishes that nitrophenyl groups are attached to the graphite powder product.

EXAMPLE 3

Preparation of a Graphite Powder Product

This example illustrates the preparation of a graphite powder product using a process of the present invention. A solution of p-$NH_3C_6H_4N_2Cl_2$ was prepared by adding a cold solution of 0.028 g $NaNO_2$ in 3 g of water to a solution of 0.16 ml concentrated HCl, 0.043 g p-phenylenediamine and 5 g of water that was stirring in an ice bath. The cold diazonium solution was added to a suspension of 2.0 g of the graphite powder of Example 1 and 18 g of water that was stirring at room temperature. After stirring for one hour, the product was dried in an oven at 125° C., subjected to Soxhlet extraction overnight with THF, and dried. An ESCA analysis of the product gave a nitrogen concentration of 4.6 atomic percent. No nitrogen was detected on the unreacted powder by ESCA. This establishes that aminophenyl groups are attached to the graphite powder product.

EXAMPLE 4

Preparation of a Graphite Fiber Product

This example illustrates the preparation of a graphite fiber product using a process of the present invention. Graphite fibers having a surface area of 0.43 m$^2$/g and a diameter of 8 microns were dried under nitrogen at 165° C. for two hours. The fibers were placed in a 0.1M solution of nitrobenzenediazonium tetrafluoroborate in anhydrous benzonitrile for two minutes. The fibers were removed, rinsed twice with anhydrous benzonitrile, subjected to Soxhlet extraction overnight with THF and dried in an oven. ESCA analysis showed a N1s signal at 406.5 eV and one at 400.5 eV with relative areas of 4.1:1. The 406.5 eV signal is caused by NO$_2$ groups and the 400.5 eV is caused by nitrogen in the original sample and by azo groups. No signal at 403 eV corresponding to diazonium groups was found. The combined nitrogen content was 2.4 atomic percent. ESCA analysis of a sample prepared by the same method with a 0.01M nitrobenzenediazonium tetrafluoborate solution gave 0.9 atomic percent nitrogen. ESCA analysis of the unreacted fiber gave 0.2 atomic percent nitrogen. This establishes that the two fiber products have attached nitrophenyl groups.

EXAMPLE 5

Preparation of a Carbon Fiber Product

This example illustrates the preparation of a graphite fiber product using a process of the present invention. A solution of 0.095 g 4-nitrobenzenediazonium tetrafluoroborate in 10 g of water was added to a stirring suspension of 2.0 g of the graphite fiber of Example 4 in 100 g of water. After stirring for 15 minutes, the fibers were removed form the solution, dried in an oven at 125° C., subjected to Soxhlet extraction overnight with THF and dried. ESCA analysis showed a N1s signal at 406.7 eV and one at 400.5 eV with relative areas of ca. 1:1. The 406.7 eV signal is caused by NO$_2$ groups and the 400.5 eV is caused by nitrogen in the original sample and by azo groups. No signal at 403 eV corresponding to diazonium groups was found. The combined nitrogen content was 1.0 atomic percent compared to 0.2 atomic percent for the unreacted fiber. This establishes that nitrophenyl groups are attached to the graphite fiber product.

EXAMPLE 6

Preparation of a Graphite Fiber Product

This example illustrates the preparation of a graphite fiber product using a process of the present invention. A solution of p-NH$_3$C$_6$H$_4$N$_2$Cl$_2$ was prepared by adding a cold solution of 0.028 g NaNO$_2$ in 3 g of water to a solution of 0.16 ml concentrated HCl, 0.043 g p-phenylenediamine and 5 g of water that was stirring in an ice bath. The cold diazonium solution was added to a suspension of 2.0 g of the graphite fibers of Example 4 and 100 g of water that was stirring at room temperature. After stirring for 20 minutes, the fibers were removed from the solution, dried in an oven at 125° C., subjected to Soxhlet extraction overnight with THF, and dried. An ESCA analysis of the product gave a nitrogen concentration of 1.7 atomic percent, compared to 0.2 atomic percent nitrogen for the unreacted fibers. This establishes that aminophenyl groups are attached to the graphite fiber product.

EXAMPLE 7

Preparation of a Graphite Fiber Product

This example illustrates the preparation of a graphite fiber product using a process of the present invention. A solution of 4-chlorobenzenediazonium nitrate was prepared by adding a solution of 0.014 g NaNO$_2$ in 3 g of water to a stirring solution of 0.025 g 4-chloroaniline, 0.070 g 90% nitric acid and 3 g of water. After stirring for 10 minutes, the diazonium solution was added to a stirring mixture of 1 g of the graphite fibers of Example 4 and 50 g of water. After stirring for 30 minutes, the fibers were removed from the solution, dried in an oven at 110° C., subjected to Soxhlet extraction overnight with THF, and dried. An ESCA analysis of the product gave a chlorine concentration of 0.4 atomic percent. No chlorine could be detected in the unreacted fibers by ESCA. This establishes that chlorophenyl groups are attached to the graphite fiber product.

EXAMPLE 8

Preparation of a Graphite Fiber Product

This example illustrates the preparation of a graphite fiber product using a process of the present invention. Approximately 0.2 g of the graphite fibers of Example 4 were added to a stirring solution of 0.025 g 4-chloroaniline, 0.070 g 90% nitric acid and 70 g of water. A solution of 0.014 g NaNO$_2$ in 2 g of water was added and the mixture was stirred for 30 minutes. 4-Chlorobenzenediazonium nitrate was formed in situ, which reacted with the graphite fibers. The fibers were removed from the solution, dried in an oven at 110° C., subjected to Soxhlet extraction overnight with THF, and dried. An ESCA analysis of the product gave a chlorine concentration of 0.4 atomic percent. No chlorine could be detected in the unreacted fibers by ESCA. This establishes that chlorophenyl groups are attached to the graphite fiber product.

EXAMPLE 9

Preparation of a Carbon Cloth Product

This example illustrates the preparation of a carbon cloth product using a process of the present invention. A carbon cloth having a surface area of 5.3 m$^2$/g was reacted with chlorobenzenediazonium hexafluorophosphate by the method of Example 1. A sample of this material that had been subjected to Soxhlet extraction with THF overnight and dried contained 0.4 atomic percent chlorine by ESCA, compared to 0.03 atomic percent chlorine in the unreacted cloth. This establishes that chlorophenyl groups are attached to the carbon cloth product.

EXAMPLE 10

Preparation of a Vitreous Carbon Product

This example illustrates the preparation of a vitreous carbon product using a process of the present invention. A small piece of a vitreous carbon plate (about 0.5 g) was stirred in a solution of 0.047 g of 4-nitrobenzenediazonium tetrafluoroborate in 30 g of water for 30 minutes. The plate was removed, dried, subjected to Soxhlet extraction with THF overnight, and dried. An ESCA analysis of the product gave a nitrogen concentration of 2.4 atomic percent, compared to 0.6 atomic percent nitrogen for the unreacted vitreous carbon plate. This establishes that nitrophenyl groups are attached to the vitreous carbon product.

EXAMPLE 11

Preparation of an Activated Carbon Product

This example illustrates the preparation of an activated carbon product using a process of the present invention. An activated carbon having a nitrogen BET surface area of 762 $m^2/g$, a nonporous surface area of 266 $m^2/g$ and a pore volume of 0.20 ml/g was reacted with chlorobenzenediazonium hexafluorophosphate by the method of Example 1. A sample of this material that had been subjected to Soxhlet extraction with THF overnight and dried contained 0.43% chlorine, compared to 0.02% for the unreacted carbon. Therefore, the activated carbon product contained 0.12 mmol/g of chlorophenyl groups, or 0.09 chlorophenyl groups per square nanometer. This establishes that chlorophenyl groups are attached to the activated carbon product.

EXAMPLE 12

Preparation of an Activated Carbon Product

This example illustrates the preparation of an activated carbon product using a process of the present invention. A solution of 1.66 g of 4-nitrobenzenediazonium tetrafluoroborate in 100 g of water was added to a stirring suspension of 7 g of the activated carbon of Example 11 and 70 g of water. Bubbles were released. After stirring for 15 minutes, the mixture was dried in an oven at 125° C. The product was subjected to Soxhlet extraction with THF overnight and dried. ESCA analysis showed a N1s signal at 406.1 eV and one at 400.9 eV with relative areas of 3.2:1. The 406.1 eV signal is caused by $NO_2$ groups and the 400.9 eV is caused by nitrogen in the original sample and by azo groups. No signal at 403 eV corresponding to diazonium groups was found. The combined nitrogen content was 5.6 atomic percent, compared to 0.3 atomic percent nitrogen for the unreacted activated carbon. This establishes that nitrophenyl groups are attached to the activated carbon product.

EXAMPLE 13

Preparation of an Activated Carbon Product

This example illustrates the preparation of an activated carbon product using a process of the present invention. A solution of p-$NH_3C_6H_4N_2Cl_2$ was prepared by adding a cold solution of 0.483 g $NaNO_2$ in 10 g of water to a solution of 2.87 ml concentrated HCl, 0.758 g p-phenylenediamine and 30 g of water that was stirring in an ice bath. The cold diazonium solution was added to a suspension of 7.0 g of the graphite fibers of Example 11 and 63 g of water that was stirring at room temperature. After stirring for 15 minutes, the product was dried at 125° C. for one hour, subjected to Soxhlet extraction overnight with THF, and dried. An ESCA analysis of the product gave a nitrogen concentration of 3.5 atomic percent, compared to 0.3 atomic percent nitrogen for the unreacted activated carbon. This establishes that aminophenyl groups are attached to the activated carbon product.

The claimed invention is:

1. A process for preparing a carbon product having an organic group attached to a carbon material comprising the step of:

reacting at least one diazonium salt with a carbon material selected from a graphite powder, a graphite fiber, a carbon fiber, a carbon cloth, a vitreous carbon product, and an activated carbon product in the absence of an externally applied electric current sufficient to reduce the diazonium salt.

2. A process of claim 1 wherein the reacting step is carried out in an aprotic medium.

3. A process of claim 1 wherein the reacting step is carried out in a protic medium.

4. A process of claim 1 wherein the diazonium salt is generated in situ.

5. A process for preparing a carbon product having an organic group attached to a carbon material comprising the step of:

reacting at least one diazonium salt with a carbon material selected from a graphite powder, a graphite fiber, a carbon fiber, a carbon cloth, a vitreous carbon product, and an activated carbon product in a protic reaction medium.

6. A process of claim 5 wherein the diazonium salt is generated in situ from a primary amine.

7. A process of claim 6 wherein the diazonium salt is generated in situ by reacting the primary amine, a nitrite and an acid.

8. A process of claim 7 wherein the nitrite is a metal nitrite and one equivalent of acid is used.

9. A process of claim 6 wherein the diazonium salt is generated in situ by reacting the primary amine with a nitrite and the primary amine contains a strong acid group.

10. A process of claim 6 wherein the diazonium salt is generated in situ by reacting the primary amine with an aqueous solution of nitrogen dioxide.

11. A process of claim 6 wherein the protic medium is an aqueous medium, and the primary amine is an amine of the formula $A_yArNH_2$, in which:

Ar is an aromatic radical selected from the group consisting of phenyl, naphthyl, anthracenyl, phenanthrenyl, biphenyl, and pyridinyl;

A is independently a substituent on the aromatic radical selected from:

a functional group selected from the group consisting of OR, COR, COOR, OCOR, COONa, COOK, $COO^-NR_4^+$, halogen, CN, $NR_2$, $S_n$, $SO_3H$, $SO_3Na$, $SO_3K$, $SO_3^-NR_4^+$, NR(COR), $CONR_2$, $NO_2$, $PO_3H_2$, $PO_3HNa$, $PO_3Na_2$, N=NR, $N_2^+X^-$, $NR_3^+X^-$, and $PR_3^+X^-$; and a linear, branched or cyclic hydrocarbon radical, unsubstituted or substituted with one or more of said functional groups;

R is independently hydrogen, $C_1$–$C_{20}$ alkyl, or aryl;

n is an integer from 1 to 8;

$X^-$ is a halide or an anion derived from a mineral or organic acid; and y is an integer from 1 to 5 when Ar is phenyl, 1 to 7 when Ar is naphthyl, 1 to 9 when Ar is anthracenyl, phenanthrenyl, or biphenyl, or 1 to 4 when Ar is pyridinyl.

12. A process of claim 5 wherein the diazonium salt is generated in situ.

13. A process of claim 5 wherein the diazonium salt is generated from a primary amine separately from the reacting step.

14. A process of claim 5 wherein the protic reaction medium is an aqueous medium.

15. A process of claim 5 wherein the organic group of the diazonium salt is substituted or unsubstituted and is selected from the group consisting of an aliphatic group, a cyclic organic group, or an organic compound having an aliphatic portion and a cyclic portion.

16. A process of claim 5 wherein the protic reaction medium is water.

17. A process of claim 5 wherein the protic medium is an alcohol-based medium.

18. A carbon product prepared according to the process of claim 1.

19. A carbon product prepared according to the process of claim 5.

* * * * *